No. 728,067. PATENTED MAY 12, 1903.
J. V. YOUNG.
SUPPORT FOR ROASTS OF MEAT.
APPLICATION FILED APR. 24, 1902.
NO MODEL.

Witnesses.
C. H. Garnett
J. Murphy

Inventor:
John V. Young
by Jas. H. Churchill
Atty.

THE NORRIS PETERS CO., PHOTO-LITHO., WASHINGTON, D. C.

No. 728,067. Patented May 12, 1903.

UNITED STATES PATENT OFFICE.

JOHN V. YOUNG, OF READING, MASSACHUSETTS.

SUPPORT FOR ROASTS OF MEAT.

SPECIFICATION forming part of Letters Patent No. 728,067, dated May 12, 1903.

Application filed April 24, 1902. Serial No. 104,491. (No model.)

*To all whom it may concern:*

Be it known that I, JOHN V. YOUNG, a citizen of the United States, residing in Reading, in the county of Middlesex and State of Massachusetts, have invented an Improvement in Supports for Roasts of Meat, of which the following description, in connection with the accompanying drawings, is a specification, like letters on the drawings representing like parts.

This invention relates to a support for roasts of meat while the latter are undergoing the process of roasting in the oven of a kitchen-range or other cooker.

The invention has for its object to provide a support with which the piece of meat to be roasted may be positioned in the oven, so as to render the meat self-basting and so as to obtain a free circulation around the meat, thereby enabling the latter to be uniformly cooked.

The invention further has for its object to provide a simple, cheap, and efficient support for the purpose specified.

Figure 1:
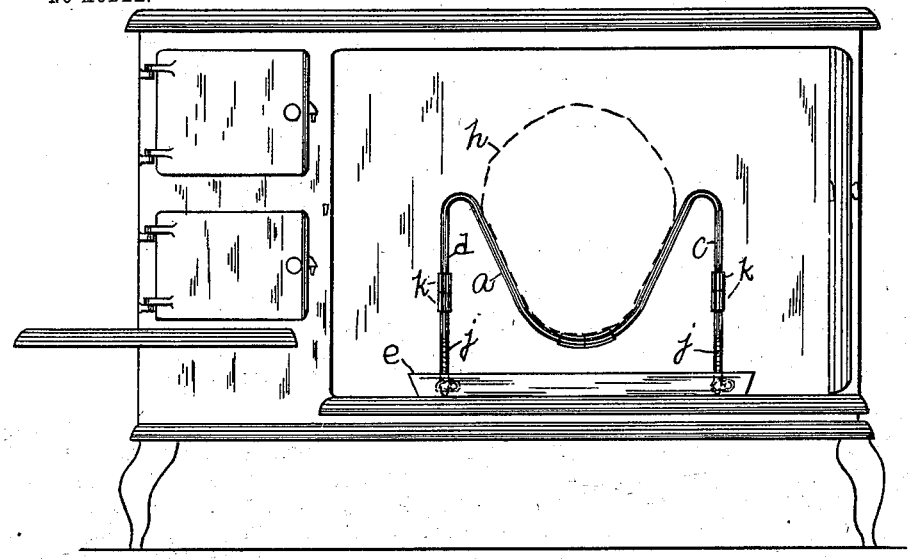
Figures 2, 3:
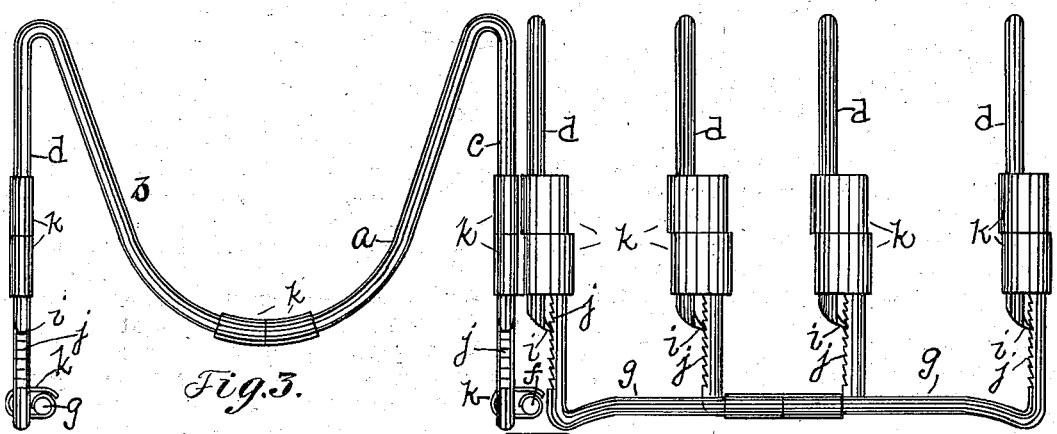

Figure 1 is a side elevation of a range provided with a support embodying this invention, the oven-door being shown open; Fig. 2, a side elevation of the support shown in Fig. 1; Fig. 3, an end elevation of said support, and Fig. 4 a plan view to be referred to.

The supporting device consists of an open frame, which may be made as herein shown, and comprises, essentially, two downwardly-extended cross-bars $a$ $b$, each connected at their opposite ends to uprights or legs $c$ $d$, which are made of sufficient length to support the said cross-bar above the bottom of the baking-pan $e$ of any suitable or usual construction.

The uprights $c$ $d$, supporting one cross-bar, as $a$, may and preferably will be connected to like uprights supporting the cross-bar $b$ by side bars $f$ $g$, which may be made in two parts extensibly secured together in any suitable manner, so that the said side bars may be lengthened and shortened to accommodate different lengths or sizes of roasts, which latter may be pieces of beef, legs of lamb, turkeys, &c. The cross-bars $a$ $b$ may and preferably will be curved, as represented in Figs. 1 and 3, so as to receive and support the meat to be roasted, which latter is conventionally represented by the dotted outline $h$.

The cross-bars $a$ $b$ may, if desired, be made in two pieces adjustably secured together, so that the support may be made wider or narrower, and the curvature of said cross-bars is such as to support the roast $h$ above the bottom of the pan $e$ a sufficient distance to afford a free circulation of heat under the roast. The uprights or legs $c$ $d$ may also be made vertically adjustable in any desired manner, so as to raise or lower the roast with relation to the bottom of the oven or the pan $e$ therein. The uprights or legs $c$ $d$ may be secured in their adjusted position, as herein represented, by bending the end of one part of each upright to form a pawl $i$, which is adapted to engage one of a series of ratchet-teeth $j$, formed in the other part of the upright. The two parts comprising each of the cross, end, and side bars may be adjustably secured together after the manner herein shown—namely, by a metal band $k$, secured to each part and passed or folded over the other part of said bar, as clearly shown in Fig. 3.

I have herein shown the various bars comprising the frame as composed of two parts adjustably secured together; but I do not desire to limit my invention in this respect, as it is evident that said bars may be made in one piece.

In practice I prefer to make the supporting-frame of wire rods, as represented in the drawings.

With my improved support the roast $h$ may be placed thereon with the fatty portions of the roast at the top, so that as the cooking proceeds the melted fat will run down over the sides and ends toward the bottom or under side of the roast, thus automatically basting the same, and thereby insuring a uniform flavor to all parts of the meat. By reference to Fig. 1 it will also be noticed that the roast $h$ is subjected to heat which is circulating all around it, thus insuring a uniform cooking of the roast. Furthermore, by making the support of wire rods, as described, it is simple of construction and can be made at a minimum expense.

Figure 4:
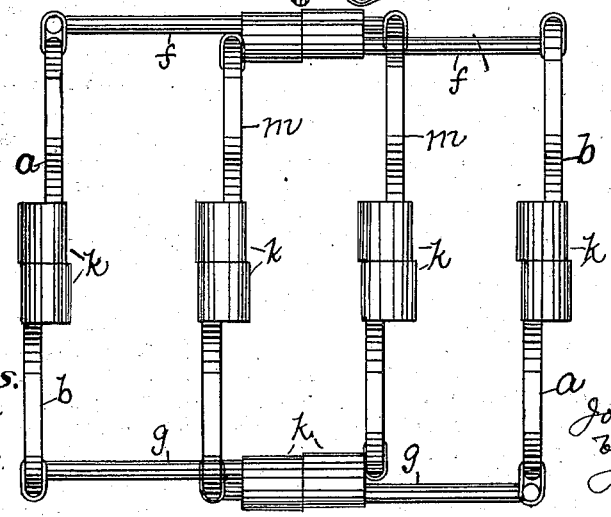

In order to provide for supporting long roasts, additional cross-bars *m* may be provided, as indicated in Figs. 2 and 4.

I claim—

1. A support for roasts of meat, comprising a frame composed of downwardly-extended cross-bars upon which the roast rests, uprights or legs rigidly connected to the upper end of said cross-bars and extended below the lowest part of said cross-bars, and means for connecting together said uprights or legs, substantially as described.

2. A support for roasts of meat comprising a frame composed of downwardly-extended cross-bars upon which the roast rests, uprights or legs rigidly connected to said cross-bars, and side bars connecting said supports or legs, substantially as described.

3. A support for roasts of meat, comprising a frame composed of downwardly-projected extensible cross-bars bodily movable toward each other and upon which the roast rests, uprights or legs rigidly connected to said cross-bars, and means for connecting together said uprights or legs, substantially as described.

4. A support for roasts of meat, comprising a frame composed of downwardly-extended cross-bars upon which the roast rests, extensible uprights or legs rigidly connected to said cross-bars near their upper end, and means for connecting together said uprights or legs, substantially as described.

5. A support for roasts of meat, comprising a frame composed of downwardly-extended cross-bars upon which the roast rests, uprights or legs connected to said cross-bars, and extensible side bars connecting said legs or uprights, substantially as described.

6. A support for roasts of meat, comprising a metal frame provided with downwardly-curved cross bars or rods upon which the roast rests, upright rods rigidly attached to the curved cross-bars near their upper end and extended below the lowermost part of the same, and side bars or rods connected with said uprights or legs, substantially as described.

7. A support for roasts of meat, comprising an open frame having downwardly-extended cross-bars upon which the roast rests, means for supporting said cross-bars in a raised position, said means being rigidly attached to said cross-bars near their upper end and means for tying said cross-bars together, substantially as described.

In testimony whereof I have signed my name to this specification in the presence of two subscribing witnesses.

JOHN V. YOUNG.

Witnesses:
   JAS. H. CHURCHILL,
   J. MURPHY.